US006859462B1

(12) United States Patent
Mahoney et al.

(10) Patent No.: US 6,859,462 B1
(45) Date of Patent: Feb. 22, 2005

(54) MINIMIZATION AND OPTIMIZATION OF OVERALL DATA TRANSFER CONNECT TIME BETWEEN HANDHELD WIRELESS COMMUNICATING DEVICES AND REMOTE MACHINES

(75) Inventors: Margaret Mary Mahoney, Raleigh, SC (US); Graham V. Poor, Raleigh, SC (US)

(73) Assignee: Orative Corporation, San Jose, CA (US)

( * ) Notice: Subject to any disclaimer, the term of this patent is extended or adjusted under 35 U.S.C. 154(b) by 767 days.

(21) Appl. No.: 09/635,912

(22) Filed: Aug. 10, 2000

Related U.S. Application Data

(60) Provisional application No. 60/148,161, filed on Aug. 10, 1999.

(51) Int. Cl.[7] .............................. H04L 12/54; H04Q 7/24
(52) U.S. Cl. ......................... 370/428; 370/338; 714/748
(58) Field of Search ................................. 370/235, 428, 370/328, 338, 252; 709/200–224; 714/746–750

(56) References Cited

U.S. PATENT DOCUMENTS

| | | | |
|---|---|---|---|
| 5,029,183 A | | 7/1991 | Tymes |
| 5,084,877 A | * | 1/1992 | Netravali et al. ............ 714/748 |
| 5,222,061 A | * | 6/1993 | Doshi et al. ................. 370/394 |
| 5,327,554 A | | 7/1994 | Palazzi, III et al. |
| 5,444,718 A | * | 8/1995 | Ejzak et al. ................. 714/748 |
| 5,465,401 A | | 11/1995 | Thompson |
| 5,546,382 A | * | 8/1996 | Fujino ......................... 714/748 |
| 5,564,070 A | | 10/1996 | Want et al. |
| 5,598,534 A | | 1/1997 | Haas |
| 5,664,091 A | * | 9/1997 | Keen ........................... 714/748 |
| 5,673,322 A | * | 9/1997 | Pepe et al. .................. 709/219 |
| 5,790,536 A | | 8/1998 | Mahany et al. |
| 5,809,415 A | | 9/1998 | Rossmann |
| 5,831,664 A | | 11/1998 | Wharton et al. |
| 5,842,210 A | | 11/1998 | Chen et al. |
| 6,014,429 A | | 1/2000 | LaPorta et al. |
| 6,076,113 A | * | 6/2000 | Ramanathan et al. ....... 709/224 |
| 6,112,323 A | * | 8/2000 | Meizlik et al. .............. 714/748 |
| 6,289,362 B1 | * | 9/2001 | Van Der Meer ............ 709/200 |

* cited by examiner

*Primary Examiner*—Steven Nguyen
(74) *Attorney, Agent, or Firm*—Shemwell Gregory & Courtney LLP

(57) ABSTRACT

A sender platform and a receiver platform, at least one of which is a handheld wireless communicating device, communicate digital data packets that are grouped into sequentially transmitted transactions. The data packets include not only the information to be communicated but also tokens. Each transaction is encoded with Begin and End tokens such that the Receiver can detect when the transmission of a transaction has been successfully completed. If communication is undesirably interrupted during transmission, the sender and receiver reconnect and resume the transfer at the point at which the last transaction failed to completely transfer. Any transaction that the receiver did not receive completely is rolled back.

7 Claims, 8 Drawing Sheets

MINIMIZATION AND OPTIMIZATION OF OVERALL DATA TRANSFER CONNECT TIME BETWEEN HANDHELD WIRELESS COMMUNICATING DEVICES AND REMOTE MACHINES

CROSS-REFERENCE TO RELATED APPLICATION

The benefit of the filing date of U.S. Provisional Patent Application Ser. No. 60/148,161, entitled "MINIMIZATION AND OPTIMIZATION OF OVERALL DATA TRANSFER CONNECT TIME BETWEEN HANDHELD WIRELESS COMMUNICATING DEVICES AND REMOTE MACHINES," filed Aug. 10, 1999, is hereby claimed, and the specification thereof is incorporated herein in its entirety by this reference.

BACKGROUND OF THE INVENTION

1. Field of the Invention

The present invention relates generally to wireless data communication networks and, more specifically, to improving the reliability and efficiency of data transfer for handheld wireless devices that communicate via a wide area network such as the Internet.

2. Description of the Related Art

While in most business organizations an Information Technology (IT) department is charged with procuring, managing, supporting and maintaining desktop, laptop and other computing systems used by individuals within the organization, handheld computing devices that such individuals may use are generally outside the auspices of the IT department and disconnected from the organization's computing infrastructure and the Internet, in effect acting as stand-alone units. To transfer data between two such devices or between such a device and one of the organization's other computing systems, a wireline connection is typically made via serial port cable and/or via telephone land line. Data can be reliably transferred back and forth because the quality and reliability of the connection are relatively high.

Computing devices are increasingly being developed with wireless data communication capability. Such devices can generally be referred to as Handheld Wireless Communicating Devices (HWCDs). HWCDs that go beyond simple data transfer capability have what is generally known as "communicating functionality." Communicating functionality means that the HWCD possesses some means of transferring data on-the-fly, i.e., while engaged in other computing processes, via a communications network, where the data transfer medium between the handheld device and the edge of the network is not physical, i.e. no cable or telephone lines are directly linked to the device.

Wireless connections are inherently unreliable due to the unpredictable nature of the medium and the limitations of radio transmitters and receivers. Connections are unstable, and can be terminated or "dropped" at any time. Connections are often unavailable altogether. When data needs to be transferred from a HWCD to a remote computer, a wireless connection is made, data is transferred, and the connection is terminated. It is a common occurrence for the connection to drop during transmission because of the instability of wireless infrastructure. In the case of a dropped connection, a new connection must be made, and the entire data set must be transmitted again. This is a problem because of the typically slow speeds of wireless transmission.

It would be desirable to provide a method and system that optimizes data transfer in a wireless communication environment in which intermittent connections can be expected. The present invention addresses this problem and others in the manner described below.

SUMMARY OF THE INVENTION

The present invention relates to a method and system in which a sender platform and a receiver platform, at least one of which is a handheld wireless communicating device (HWCD), communicate digital data packets that are grouped into sequentially transmitted transactions. The data packets include not only the information to be communicated but also tokens. Each transaction is encoded with Begin and End tokens such that the receiver can detect when the transmission of a transaction has been successfully completed. If communication is undesirably interrupted during transmission, the sender and receiver reconnect and resume the transfer at the point at which the last transaction failed to completely transfer. Any transaction that the receiver did not receive completely is rolled back. In other words, that transaction is re-transmitted in its entirety. Nevertheless, any transactions that were received completely are released for immediate access by the processing elements of the receiver.

In an illustrative embodiment of the invention, the sender maintains a change record that reflects any changes to data to be transferred that are made on the sender platform while no connection exists between the sender and receiver platforms. When a connection is made between the sender and receiver, the sender constructs a transfer script that groups the data packets into transactions. Before beginning transmission of the actual transfer script, which includes the information (in data packet format) to be transferred, the sender transmits to the receiver a skeletal transfer script that identifies the transactions to be transmitted but does not include the information data packets. The receiver then tracks the progress of the transfer by comparing received tokens to the skeletal transfer script. The receiver creates and maintains a transfer record to track the progress of the transfers. If a transaction was not completely received, the receiver can use the transfer record to identify the last transaction that was completely received and roll back the transaction that was incompletely received. Not only do Transaction Begin and End tokens in the transmission identify the beginning and end of each transaction, but similar tokens identify the beginning and end of each packet and each transfer script. The sender expects to receive an acknowledgement, in the form of an Acknowledgement (ACK) token, of each End token it sends. If the sender does not receive an expected ACK token from the receiver before a predetermined timeout interval has passed, the connection is deemed to have been dropped. When the sender receives an ACK token in response to a transfer script End token, it removes from the transfer script and change record all transactions that have been successfully transferred. Those transactions that had not been successfully transferred remain in the transfer script and change record for retransmission after a connection is re-established.

It is to be understood that both the foregoing general description and the following detailed description are exemplary and explanatory only and are not restrictive of the invention, as claimed.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION

The following is a more detailed description of an exemplary embodiment of the invention.

Figure 1:
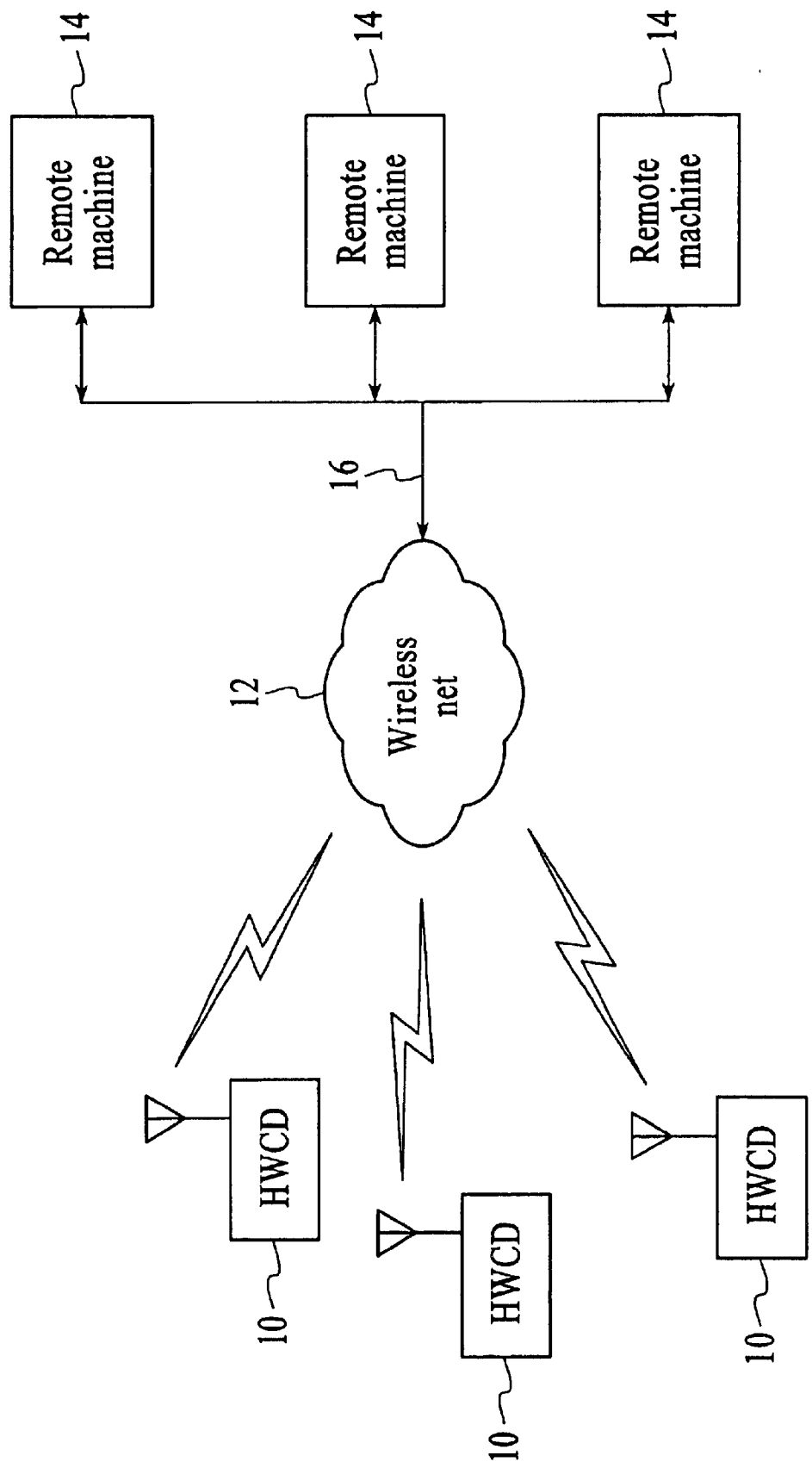
FIG. 1 illustrates a handheld wireless communicating device.

As illustrated in FIG. 1, in the exemplary embodiment one or more handheld wireless communication devices (HWCDs) 10 can communicate bidirectionally via a wireless network 12 with each other as well as with one or more remote machines 14, i.e., computers, via a wired network 16. (Note that in other embodiments of the invention, such as one in which the HWCD is a pager or other device that receives but cannot transmit information, communication may be unidirectional.) Remote machines 14 can be servers on which information is stored that HWCDs 10 can access. Wired network 16 can be any wide area computer network, such as the global super-network presently known as the Internet or a portion thereof. In accordance with terminology commonly used in the art, the combination of wireless network 12 and wired network 16 may be referred to as the "Wireless Internet." The structure and operation of the Wireless Internet is well-known in the art and therefore not described in detail in this patent specification. Any of HWCDs 10 and remote machines 14 can be configured with software in accordance with the present invention to provide a novel data transfer system and method, but the hardware aspects and general operation of HWCDs 10 are otherwise generally well-known in the art and therefore not described in detail in this patent specification. Generally speaking, HWCDs 10 can include general-purpose computing devices and similar intelligent electronic devices, such as those commonly referred to as personal digital assistants, phones, pagers, and devices that allow users to send and receive electronic mail.

Figure 2:
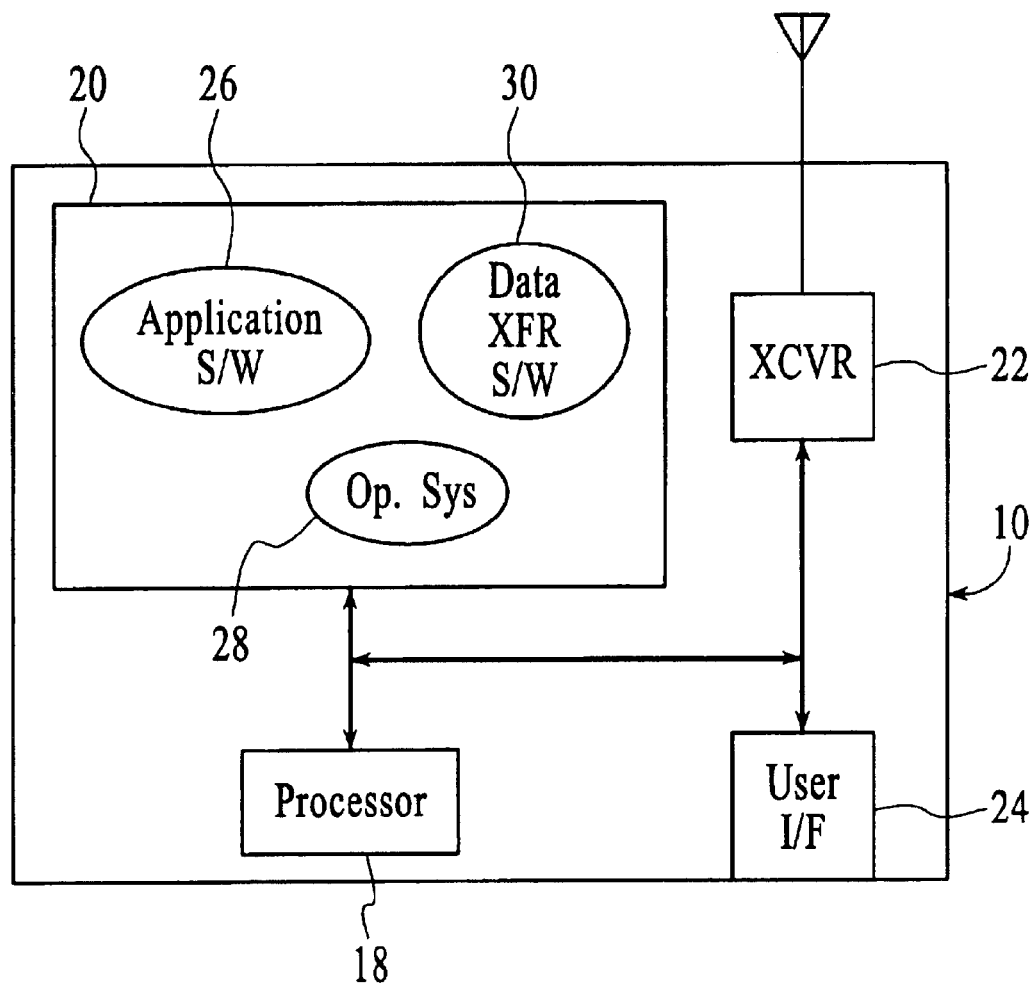
FIG. 2 illustrates a network environment.

As illustrated in FIG. 2, HWCD 10 includes a processor 18, a memory 20, a radio transceiver 22 and a user interface 24. Depending upon the purpose of HWCD 10, user interface 24 may include a keyboard and a display, for example. If HWCD 10 is of the type known as a personal digital assistant, user interface 24 may include a pressure-sensitive tablet on which text and graphics can be entered using a stylus. In general, processor 18 operates upon information stored in memory 20 and communicates input and output data with user interface 24 and transceiver 22. Memory 20 can include any suitable combination of random-access memory, read-only memory or other types of volatile and non-volatile memory and data storage devices. Transceiver 22 can transmit and receive digital data by means of radio signals. The resulting bidirectional radio communications link thus serves the same purpose of facilitating communications with other computing and communicating devices as the network communications link in a wired computer network, such as a local area network or wide area network. As noted above, these aspects of HWCD 10 are well-understood by persons skilled in the art to which the present invention pertains and are therefore not described in further detail in this patent specification.

Processor 18 of HWCD 10 operates in accordance with suitable programming. The software elements effecting this programming conceptually include, among other elements, application software 26, operating system software 28, and data transfer software 30. Application software 26 enables processor 18 to perform tasks commonly referred to as user applications, and may include, for example, a Web browser application, an electronic mail (e-mail) application, a time and schedule organizer, a word processor, and so forth. Note that many such applications commonly support communication with remote computers or servers. Operating system software 28 represents the software elements that enable processor 18 to perform basic tasks such as accessing memory 20 and communicating data with user interface 24 and transceiver 22. Other software of types commonly included in devices of this type can also be included, but such other software is not specifically illustrated for purposes of clarity. Data transfer software 30 enables processor 18 to effect the novel data transfer methods of the present invention and is described in further detail below. Although elements 26, 28 and 30 are conceptually illustrated as software residing in memory 20, persons skilled in the art will understand that, because the resulting programming of processor 18 is nothing more than digital logic, in other embodiments of the invention any or all of elements 26, 28 and 30 can be implemented wholly in software, wholly in hardware, or in any suitable combination of software and hardware logic. Similarly, such persons will understand that these software elements may not reside in main memory in their entireties or simultaneously at any given point in time but rather are depicted that way for purposes of illustration only.

Figure 3A:
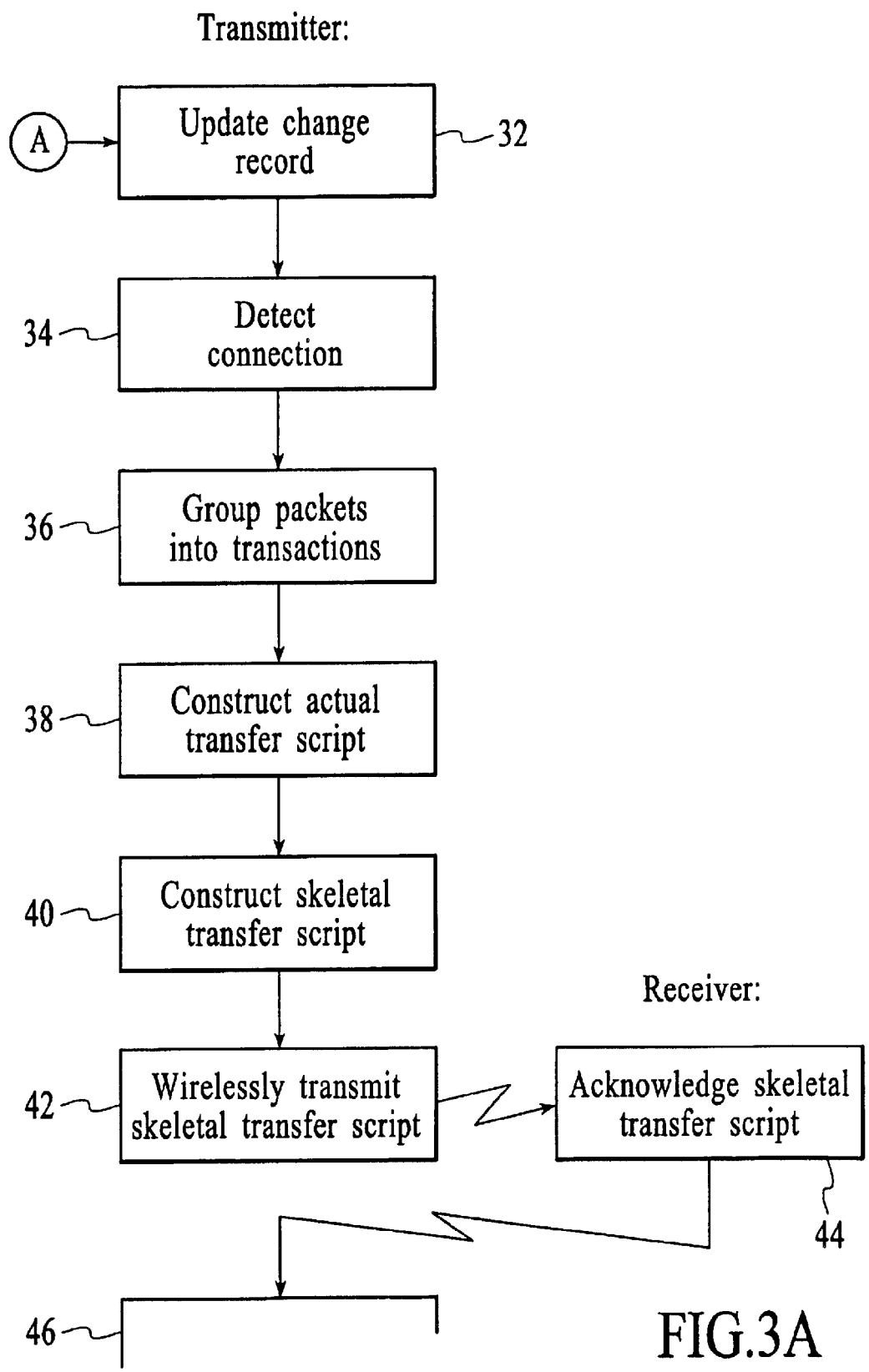
FIG. 3A is a flow diagram illustrating the communication of information, tokens, and acknowledgements between the sender and receiver.
Figure 3B:
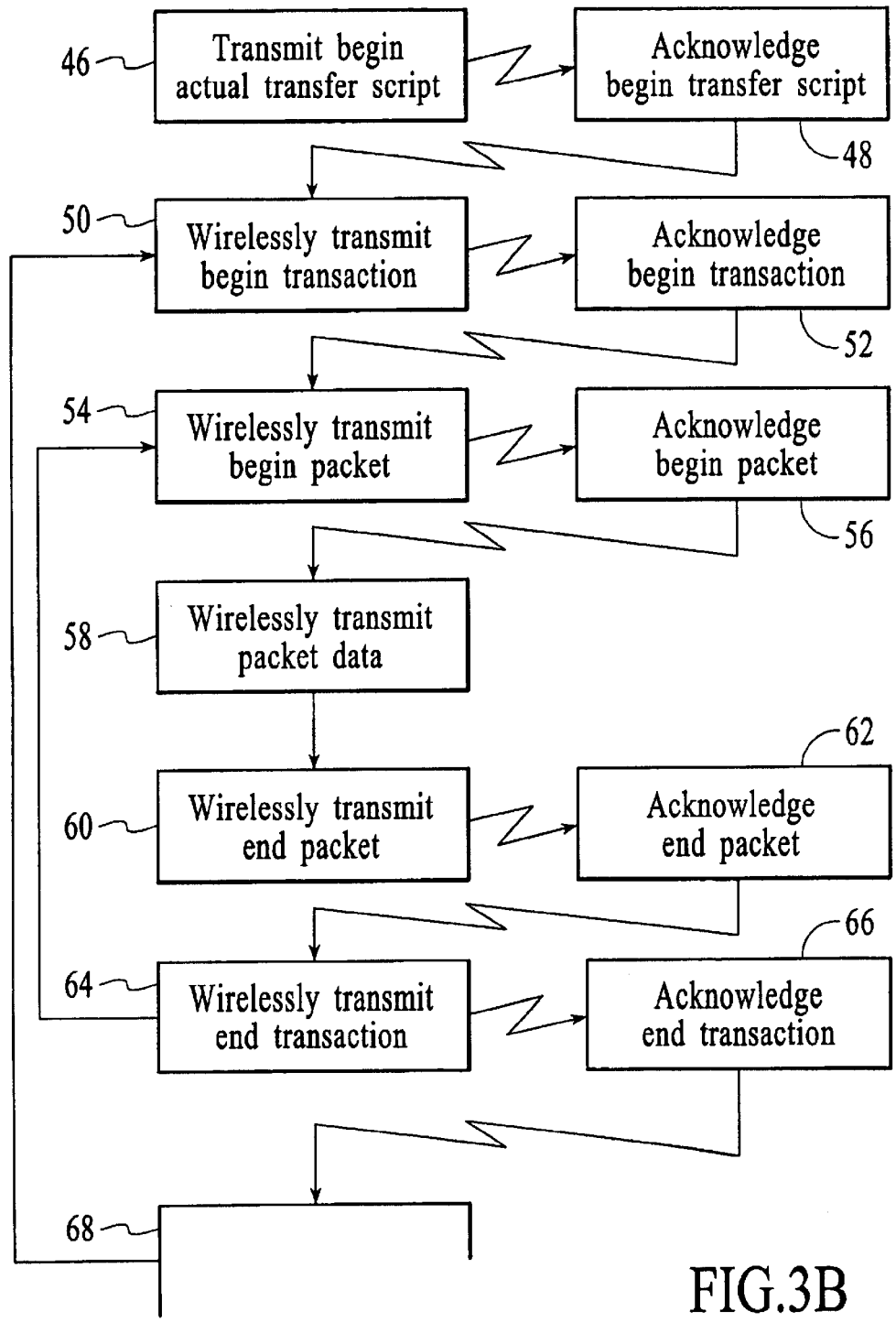
FIG. 3B is a continuation sheet of FIG. 3A.
Figure 3C:
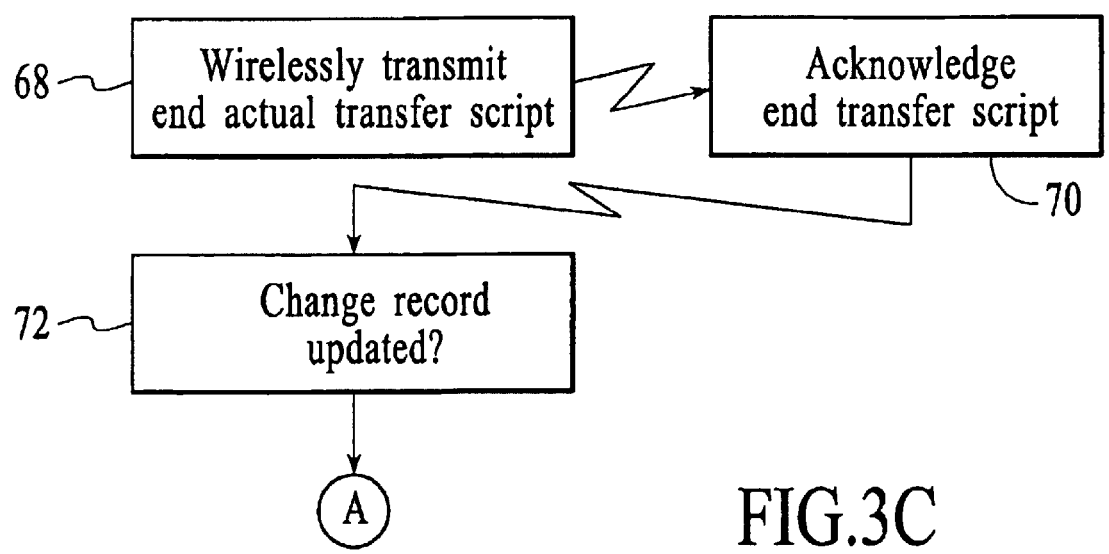
FIG. 3C is a continuation sheet of FIG. 3B.

The method for transferring data between a sender and receiver is illustrated in FIGS. 3A–C. At least one of the sender and receiver is a HWCD 10, and the other can be another HWCD 10, a remote machine 14, or any similar computing device or system that is accessible via the Wireless Internet. In FIGS. 3A–C, the sender's actions are indicated in a left-hand column, and the receivers in a right-hand column.

At step 32 the sender updates a change record. A change record is an area of memory 20 that acts as temporary storage or a queue for information to be transmitted. For example, a client process under the control of application software 26 may attempt to transmit a request for information to a remote machine 14 that is acting as a server. The method may include building the request in steps. As each step adds to the request, processor 18 stores the newly added information in the change record and also stores an indication of the relationship between the added information and any pre-existing information.

At step 34 the sender attempts to initiate a network connection with the receiver in the conventional manner using a suitable protocol. The method proceeds to step 36 when it is determined that the sender and receiver can communicate with one another. As indicated above, the physical connection can include both wireless and wired links in the Wireless Internet.

At step 36 the sender retrieves the information from the change record, groups the information into data packets, and groups the data packets into transactions. Although in the context of the present invention, the term "transaction" refers to a collection of packets, it is related to the term as commonly used in the context of transaction processing. In the context of the present invention, a transaction is a semantically intact or unitary group of data packets. In other words, the selected packets together define the requisite properties of a "transaction," as that term is used in the context of transaction processing. As the term is conventionally used in the art, a transaction refers to a set of procedures involving a system of two or more machines that has the following four properties, commonly referred to collectively by the acronym ACID: atomicity, consistency, isolation, and durability. Atomicity means that the transaction should either be completed or all data rolled back in all machines to its state prior to initiation of the transaction. Consistency means that a transaction should transform a system from one consistent state to another consistent state. Isolation means that each transaction should happen independently of transactions occurring at the same time. Durability means that completed transactions should remain permanent, even during system failure. In the present invention, packets are grouped, if possible, in a manner that ensures ACID properties. Accordingly, when the receiver completely receives a transaction, it can immediately rely upon and use all of the received data because the data is semantically intact and not dependent upon any other data. Nevertheless, if the receiver does not completely receive a transaction due to disruption of the transfer or other undesirable condition, the transfer is rolled back, and the transaction must be re-transmitted, as described in further detail below.

At step 38 the sender constructs an actual transfer script and, at step 40, constructs a skeletal transfer script. The actual transfer script has the following format:

```
Transfer Script Begin
Transaction 1 Begin
Packet 1 Begin
Dataset 1 (information)
Packet 1 End
Packet 2 Begin
Dataset 2 (information)
Packet 2 End
. . .
Packet n Begin
Dataset n (information)
Packet n End
Transaction 1 End
Transaction 2 Begin
. . .
Transaction 2 End
. . .
Transaction m Begin
. . .
Transaction m End
Transfer Script End
```

In the above example, the transfer script includes m transactions, an exemplary one of which includes n data packets. "Transfer Script Begin" is a token intended to indicate to the receiver that a transfer script is about to be sent. "Transfer Script End" is a token intended to indicate to the receiver that the transfer script has been sent. "Transaction x Begin," where x is replaced by a number from one to m, is a token intended to indicate to the receiver that a transaction is about to be sent. "Transaction x End" is a token intended to indicate to the receiver that the transaction has been sent. Similarly, "Packet y Begin," where y is replaced by a number from one to n, is a token intended to indicate to the receiver that a data packet is about to be sent. "Packet y End" is a token intended to indicate to the receiver that a data packet has been sent. "Dataset y" indicates the digital information itself that has been retrieved from the change record and packetized for transmission to the receiver.

The skeletal transfer script mirrors the actual transfer script but does not include the data packets. Rather, it includes only the various Begin and End tokens. The skeletal transfer script is intended to identify for the receiver the items to be sent in the forthcoming transmissions. A skeletal transfer script therefore has the following format:

```
Transfer Script Begin
Transaction 1 Begin
Transaction 1 End
Transaction 2 Begin
Transaction 2 End
Transaction m Begin
Transaction m End
Transfer Script End
```

At step 42 the sender transmits the skeletal transfer script. If the receiver received the entire skeletal transfer script, at step 44 the receiver transmits an acknowledgement back to the sender.

At step 46 the sender indicates it is beginning to transmit the actual transfer script by transmitting a Transfer Script Begin token in response to the acknowledgement. If the receiver received this token, at step 48 it transmits an acknowledgement back to the sender.

At step 50 the sender transmits a Transaction x Begin token in response to the acknowledgement. If the receiver received this token, at step 52 it transmits an acknowledgement back to the sender.

At step 54 the sender transmits a Packet y Begin token in response to the acknowledgement. If the receiver received this token, at step 56 it transmits an acknowledgement back to the sender. At step 58 the sender transmits the packet data (Dataset y) in response to the acknowledgement. At step 60 the sender transmits a Packet y End token. If the receiver received this token, at step 62 it transmits an acknowledgement back to the sender. If the transaction (Transaction x) includes more than one packet, steps 54–62 are repeated. Step 64 is reached when the last packet of Transaction x has been transmitted and acknowledged.

At step 64 the sender transmits a Transaction x End token in response to the acknowledgement. If the receiver received this token, at step 66 it transmits an acknowledgement back to the sender. If the sender does not receive such an acknowledgement token within a predetermined timeout interval following transmission of the Transaction x End token, the transaction is rolled back. In other words, the sender re-transmits Transaction x in its entirety.

At step 68 the sender transmits the Transfer Script End token in response to the acknowledgement of the Transaction m End token. If the receiver received this token, at step 70 it transmits an acknowledgement back to the sender. Step 72 is intended to indicate that steps 34–72 are repeated if the change record had again been updated since the time the changed data was transmitted. Note that even if the connection between the sender and receiver is dropped, processor 18, under control of application software 26 or other element of the sender, can continue to update the change record while no connection exists because any data that is changed during that time will be transmitted as soon as a connection is re-established. The intermittence of connections is therefore, in effect, transparent to the sender. In other words, application software 26 or other elements of the sender, can operate essentially independently of the network connection and need not be concerned with the reliability of the connection. Instead, data transfer software 30 is responsible for all aspects of data transfer, including taking into account potential intermittence of the connection.

Figure 4:
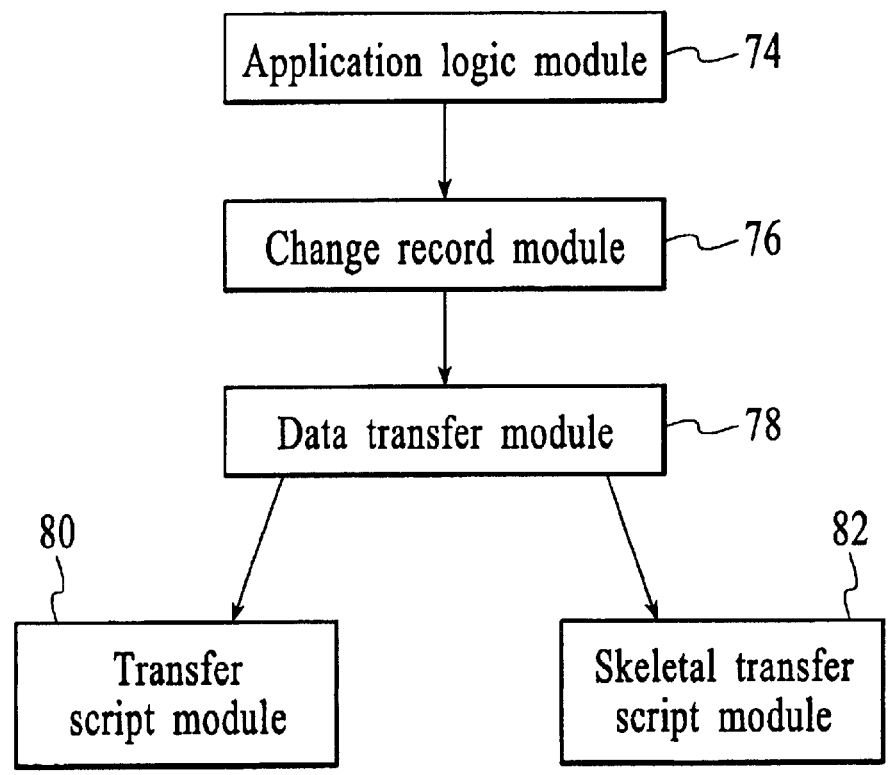
FIG. 4 illustrates an exemplary software structure of a sending system in accordance with one embodiment of the invention.
Figure 6:
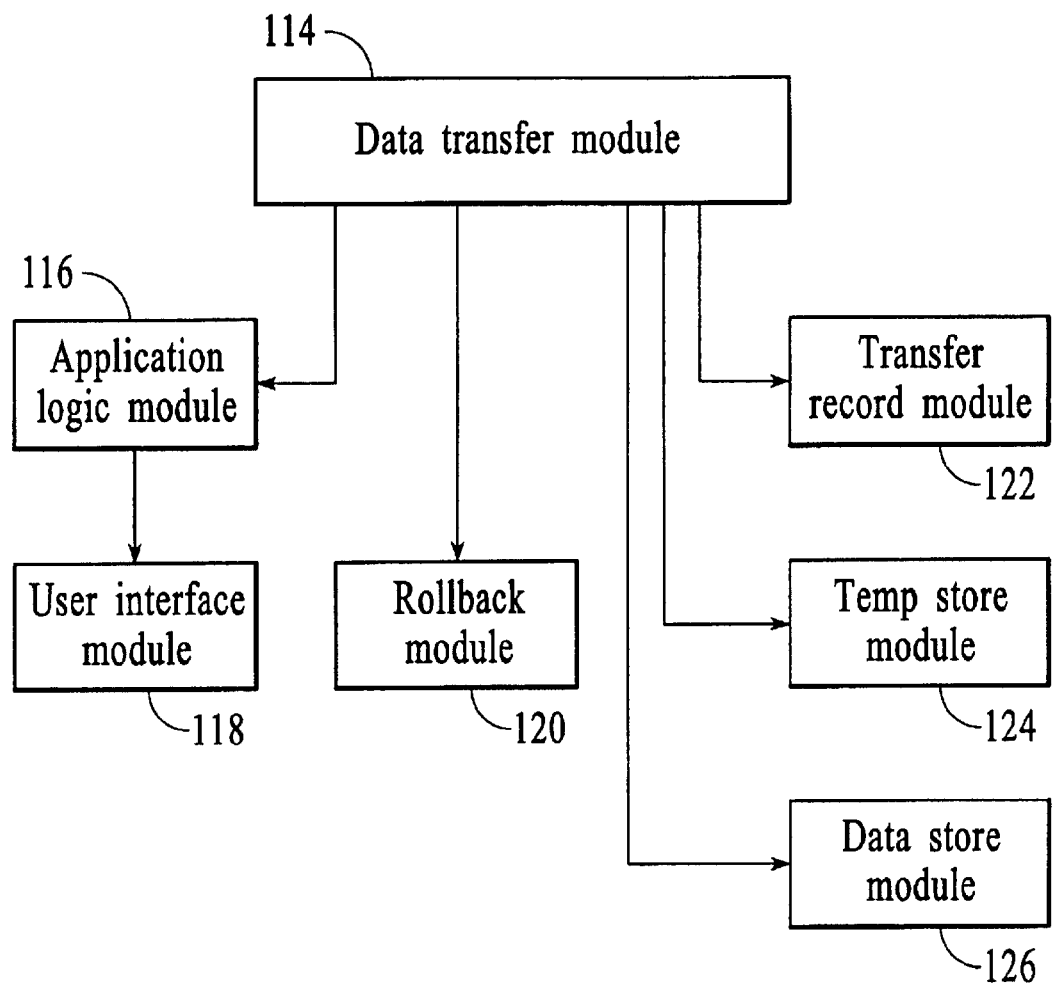
FIG. 6 illustrates an exemplary software structure of a receiving system in accordance with one embodiment of the invention.
Figure 7:
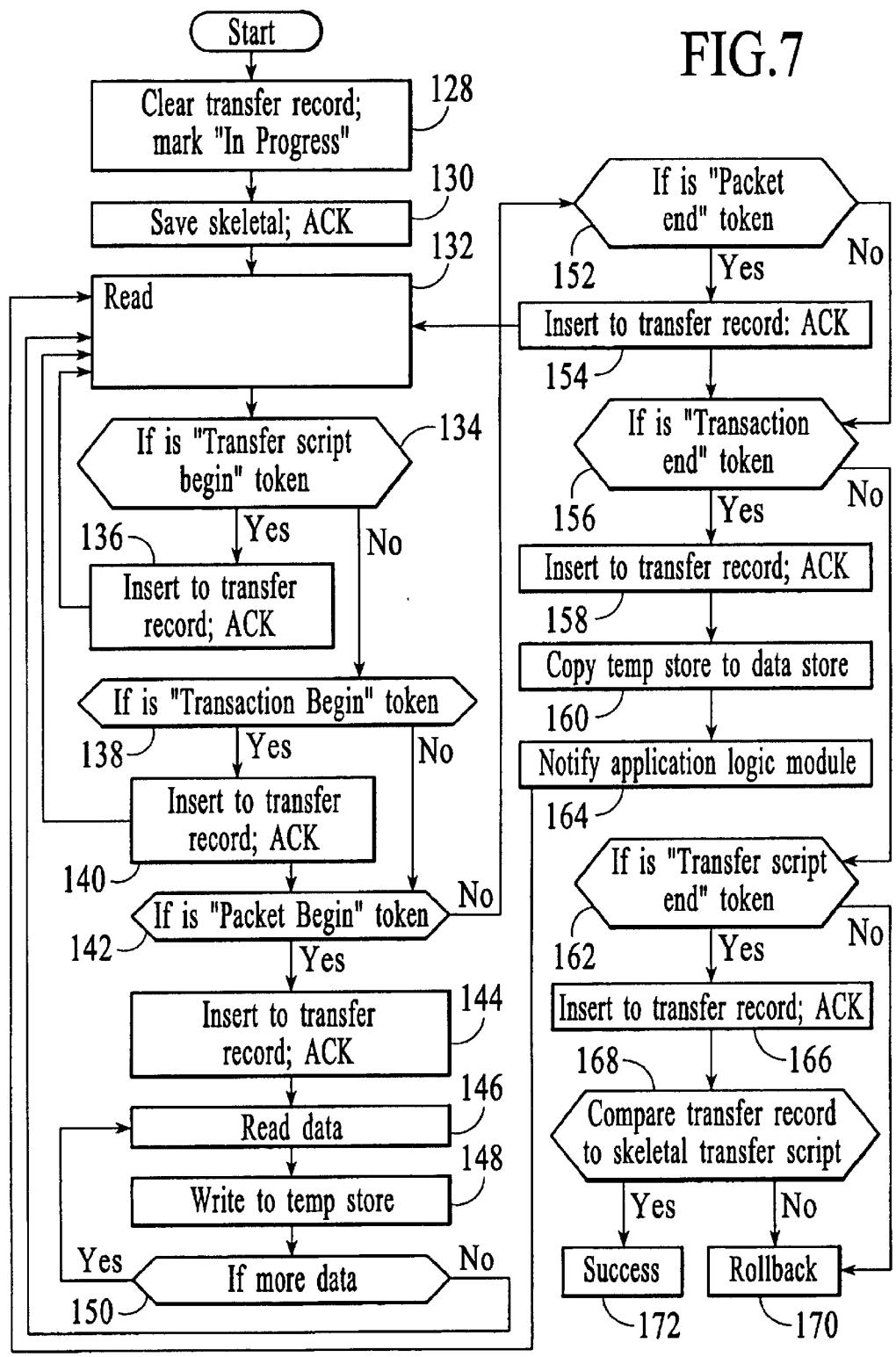
FIG. 7 is a flow diagram illustrating a method for receiving data.

FIGS. 4 and 6 illustrate exemplary structures for data transfer software 30, with FIG. 4 illustrating the portion of software 30 that controls wireless data transmission and FIG. 6 illustrating the portion that controls wireless data reception. Although in the illustrated embodiment of the invention, HWCD 10 can act as both a sender and a receiver, note that in other embodiments a sender device may not be capable of reception, and a receiving device may not be capable of transmission.

As illustrated in FIG. 4, an application logic module 74 defines the highest level of the sender software structure portion. The following illustrates some exemplary pseudo-code for module 74 relating to the functions of creating a new change record, deleting a change record, and updating a change record:

```
ApplicationLogicModule.NewRecord(Record)
    ChangeRecordModule.Append(Record, NEW)
ApplicationLogicModule.DeleteRecord(Record)
    ChangeRecordModule.Append(Record, DELETE)
ApplicationLogicModule.UpdateRecord(Record)
    ChangeRecordModule.Append(Record, UPDATE)
```

A change record module 76 defines the next level of the software structure. The following illustrates some exemplary pseudo-code for module 76:

```
ChangeRecordModule.Append(Record,Status) // Status = (NEW,
DELETE, UPDATE)
    IF (TransactionList.RecordFound(Record) is FALSE)
        Packet = createPacket.Record,I)
        I = I + 1
        Transaction = createTransaction( )
        TransactionList.Add(Transaction)
        Transaction.AddPacket(Packet)
    ELSE
        IF (Record.HasLinkedRecords( ) is TRUE)
            RecordList = Record.GetLinkedRecords( )
            FOR EACH of RecordList
                LinkedPacket = createPacket(LinkedRecord,I)
                I = I + 1
                Transaction.AddPacket(LinkedPacket)
            END FOR
        END IF
    END IF
ChangeRecordModule.ClearChangeRecord()
    TransactionList.ClearList( )
```

The next level of the sender software structure is defined by a data transfer module 78, which includes an actual transfer script module 80 and a skeletal transfer script module 82. The following illustrates some exemplary pseudo-code for modules 78, 80 and 82:

```
TransferScriptModule.CreateTransferScript()
    TransferScript.Insert("Transfer Script Begin")
    I = 0
    FOR EACH ChangeRecord.TransactionListElement
        Transaction = ChangeRecord.TransactionList.GetTransaction(I)
        TransferScript.Insert("Transaction", I, "Begin")
        J = 0
        FOR EACH Transaction.GetPacket(j)
            TransferScript.Insert("Packet", j, "Begin")
            TransferScript.Insert(Packet.GetData( ))
            TransferScript.Insert("Packet", j, "End")
        END FOR
        TransferScript.Insert("Transaction", I, "End")
    END FOR
    TransferScript.Insert("Transfer Script End")
SkeletalTransferScriptModule.CreateTransferScript()
    SkeletalTransferScript.Insert("Skeletal Transfer Script Begin")
    I = 0
    FOR EACH ChangeRecord.TransactionListElement
        Transaction = ChangeRecord.TransactionList.GetTransaction(I)
        SkeletalTransferScript.Insert("Transaction", I, "Begin")
        SkeletalTransferScript.Insert("Transaction", I, "End")
    END FOR
    SkeletalTransferScript.Insert("Skeletal Transfer Script End")
```

Figure 5:
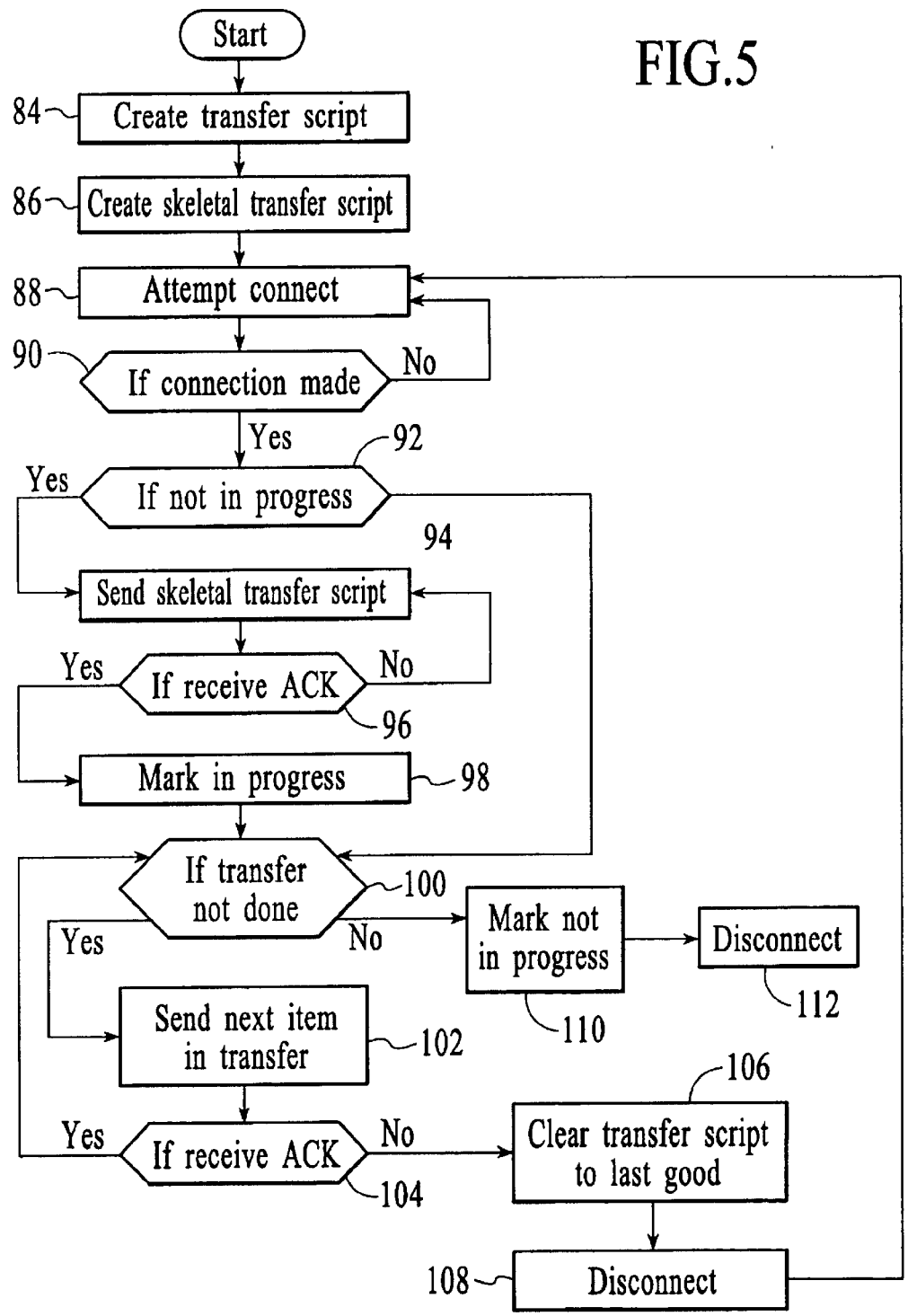
FIG. 5 is a flow diagram illustrating a method for sending data.

The method performed by the sender in accordance with data transfer module 78 and its sub-modules 80 and 82 is illustrated in further detail in FIG. 5. At step 84 the sender creates the actual transfer script and, at step 86, the skeletal transfer script. At step 88 it attempts to establish a Wireless Internet connection with an intended receiver. Step 90 indicates that if the connection is not successfully made, step 88 is repeated. If the connection is successfully made, at step 92 it is determined whether a transfer is already in progress. If not, then at step 94 a transfer is begun by sending the skeletal transfer script. Step 96 indicates that if an acknowledgement token is received from the receiver, acknowledging receipt of the skeletal transfer script, a transfer is deemed to be in progress at step 98, an indication to that effect is saved or marked, and step 100 occurs next. If no acknowledgement token is received, then step 94 is repeated.

At step 100 it is determined whether more items are to be transferred. Items can include both tokens and data packets. If there are more items to be transferred, the next item is sent at step 102. Step 104 indicates that if an acknowledgement is received from the receiver, acknowledging receipt of the item, step 100 is repeated. If no acknowledgement is received within a predetermined time interval, the connection is deemed to have been dropped, and at step 106 the sender deletes from the actual transfer script all items receipt of which has already been acknowledged. Then, at step 108 the connection is terminated and step 88 is repeated by attempting to renew the connection. Similarly, if it is determined at step 100 that there are no more items to be transferred, the transfer is deemed to be not in progress, and the indication is changed to reflect that state at step 110. Then, at step 112 the connection is terminated.

As illustrated in FIG. 6, a data transfer module 114 defines the highest level of the receiver software structure portion. Data transfer module 114 includes the following sub-modules: an application logic module 116, a user interface module 118, a rollback module 120, a transfer record module 122, a temporary storage module 124, and a data storage module 126. The following illustrates some exemplary pseudo-code relating to the above-listed modules:

```
TransferRecordModule.Clear()
TransferRecordModule.Insert(String)
TransferRecordModule.ClearToLastGood()
TransferRecordModule.CompareTo(SkeletalTransferScript)
TempStoreModule.Clear()
TempStoreModule.AddRecord(Record)
TempStoreModule.GetNextRecord()
DataStoreModule.Commit()
    FOR EACH Record in TempStore
        Record = TempStore.GetNextRecord( )
        StoreRecord(Record)
    END FOR
ApplicationLogicModule.UponRefresh()
    RefreshData( )
    UIModule.Update( )
UserInterfaceModule.Update()
RollbackModule.Rollback()
    TempStoreModule.Clear( )
```

The method performed by the receiver in accordance with data transfer module 114 and its sub-modules is illustrated in further detail in FIG. 6. At step 128, in response to detection of a connection initiated by the sender, the receiver clears the transfer record and saves an indication that a transfer is in progress. The transfer record is an area of memory in which the receiver records by means of the Begin and End tokens indications of all items it receives. The following is an example of a transfer record:

```
Transfer Script Begun
Transaction 1 Begun
Packet 1 Received
Packet 2 Received
. . .
Packet n Received
Transaction 1 Received
Transaction 2 Begun
. . .
Transaction 2 Received
. . .
Transaction m Begun
. . .
Transaction m Received
Transfer Script Ended
```

At step 130 the receiver saves in memory the skeletal transfer script it receives and then transmits an acknowledgement token to the sender. At step 132 the receiver reads the next item it receives from the sender. If at step 134 it is determined that the item is a Transfer Script Begin token, at step 136 the receiver transmits an acknowledgement token and records the event in the transfer record before returning to step 132. If at step 138 it is determined that the item is a Transaction Begin token, at step 140 the receiver transmits an acknowledgement token and records the event in the transfer record before returning to step 132. If at step 142 it is determined that the item is a Packet Begin token, at step 144 the receiver transmits an acknowledgement token and records the event in the transfer record before proceeding to step 146.

At step 146 the receiver reads the received packet data, writes it to the temporary storage at step 148, and if it is determined at step 150 that the packet has more data, returns to step 146. Otherwise, it returns to step 132 to read the next received item.

If at step 152 it is determined that the item is a Packet End token, at step 154 the receiver transmits an acknowledgement token and records the event in the transfer record before returning to step 132. If at step 156 it is determined that the item is a Transaction End token, at step 158 the receiver transmits an acknowledgement token and records the event in the transfer record before proceeding to step 160. If the item is not a Transaction End token, the method proceeds to step 162.

At step 160 the temporary storage data are copied to a main data storage area. Data in the main data storage area are deemed reliable in the sense that they represent one or more transactions and are thus immediately usable by the receiver. The data may, for example, represent a request for the receiver, acting as a server, to retrieve information from a database (not shown) and transmit it to the client (sender of the request). At step 164 application logic module 116 is notified, and the method returns to step 132.

If at step 162 it is determined that the item is a Transfer Script End token, at step 166 the receiver transmits an acknowledgement token and records the event in the transfer record before proceeding to step 168. If the item is not a Transfer Script End token, the transaction is rolled back at step 170. In other words, the receiver does not use the data that has been copied to the main data storage area and resets the area to its state prior to the beginning of the current transaction.

At step 168 the receiver compares the transfer record to the skeletal transfer script. If they match, step 172 indicates successful transfer in accordance with the script, and the method can begin again. If they do not match, the receiver rolls back the current transaction as described above with regard to step 170.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for transmitting information from a handheld wireless sender to a remote receiver, comprising:

entering said information into a change record in said sender;

detecting in said sender an indication of a wireless connection between said sender and said receiver;

grouping into packets said information in said change record;

grouping said packets in said sender into semantically unitary transactions having begin and end tokens delimiting each transaction;

constructing an actual transfer script in said sender having at least one transaction and having begin and end tokens delimiting said actual transfer script;

constructing a skeletal transfer script mirroring said actual transfer script but not having said packets, said skeletal transfer script having begin and end tokens delimiting said skeletal transfer script;

wirelessly beginning transmitting said skeletal transfer script from said sender to said receiver;

in response to receipt in said sender of an acknowledgement of receipt of said skeletal transfer script by said receiver, wirelessly beginning transmitting said actual transfer script from said sender to said receiver;

in response to receipt of an acknowledgement of receipt of a transaction of said actual transfer script from said receiver, continuing transmitting said actual transfer script from said sender to said receiver by beginning transmitting a next transaction in said actual transfer script; and following detection of an indication of a renewed wireless connection between said sender and said receiver, rolling back or re-transmitting a transaction in its entirety from said sender to said receiver if an acknowledgement of receipt of said transaction is not received by said sender within a predetermined time interval after transmitting an end token indicating an end of said transaction.

2. The method of claim 1, wherein:

in response to receipt of an acknowledgement of receipt of a packet of a transaction from said receiver, continuing transmitting a transaction from said sender to said receiver by beginning transmitting a next packet in said transaction; and following detection of an indication of a renewed wireless connection between said sender and said receiver, said sender re-transmits a packet in its entirety if said sender does not receive an acknowledgement of receipt of said packet within a predetermined time interval after transmitting an end token indicating an end of said packet.

3. The method of claim 1, wherein, in response to receipt of an acknowledgement of receipt of said actual transfer script from said receiver, said sender deletes said transactions from said actual transfer script and said change record.

4. A method for receiving information in a handheld wireless receiver device from a transmitter device, comprising:

detecting an indication of a wireless connection between said sender and said receiver;

wirelessly receiving a skeletal transfer script having begin and end tokens delimiting each transaction of an actual transfer script having at least one transaction;

wirelessly transmitting to said sender an acknowledgement of receipt of said skeletal transfer script;

wirelessly receiving said actual transfer script, said actual transfer script having begin and end tokens delimiting each transaction in said actual transfer script;

building a transfer record having indications of receipt of each data packet of a transaction having at least one data packet and indications of receipt of each begin token and end token;

in response to receipt of an end token following a received data packet, committing said received data packet to a local memory area;

in response to receipt of a token indicating an end of an actual transfer script, comparing said transfer record to said skeletal transfer script; and wirelessly transmitting a token indicating receipt of said actual transfer script if said transfer record matches said skeletal transfer script.

5. A system for transmitting information in a handheld wireless sender device to a receiver device, comprising:

a change record controller having means for defining a change record memory area in which said information is storable prior to transmission from said sender device;

a data transfer controller grouping said information in said change record memory area into packets, grouping said packets into semantically unitary transactions having begin and end tokens indicating a beginning and end of a transaction, constructing an actual transfer script having at least one transaction and having begin and end tokens indicating a beginning and end of said actual transfer script;

a skeletal transfer script controller wirelessly transmitting a skeletal transfer script mirroring said actual transfer script but not having said packets, said skeletal transfer script having begin and end tokens indicating a beginning and end of said skeletal transfer script; and an actual transfer script controller wirelessly beginning transmitting said actual transfer script in response to receipt of an acknowledgement of receipt of said skeletal transfer script from said receiver, said actual transfer script controller continuing transmitting said actual transfer script by beginning transmitting a next transaction in said actual transfer script in response to receipt of an acknowledgement of receipt of a transaction of said actual transfer script from said receiver, said actual transfer script controller rolling back or re-transmitting a transaction in its entirety following detection of an indication of a renewed wireless connection between said sender and said receiver if an acknowledgement of receipt of said transaction is not received within a predetermined time interval after transmitting an end token indicating an end of said transaction.

6. The system of claim 5, wherein:

in response to receipt of an acknowledgement of receipt of a packet of a transaction from said receiver, said actual transfer script controller continues transmitting a transaction by beginning transmitting a next packet in said transaction; and following detection of an indication of a renewed wireless connection between said sender and said receiver, said actual transfer script controller re-transmits a packet in its entirety if said sender does not receive an acknowledgement of receipt of said packet within a predetermined time interval after transmitting an end token indicating an end of said packet.

7. The system of claim 5, wherein, in response to receipt of an acknowledgement of receipt of said actual transfer script from said receiver, said actual transfer script controller deletes said transactions from said actual transfer script and said change record.

* * * * *